United States Patent
Sharma et al.

(10) Patent No.: US 12,452,879 B2
(45) Date of Patent: *Oct. 21, 2025

(54) COMMUNICATIONS DEVICE, INFRASTRUCTURE EQUIPMENT AND METHODS

(71) Applicant: Sony Group Corporation, Tokyo (JP)

(72) Inventors: Vivek Sharma, Basingstoke (GB); Yassin Aden Awad, Basingstoke (GB); Yuxin Wei, Basingstoke (GB); Hideji Wakabayashi, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,729

(22) Filed: Apr. 18, 2024

(65) Prior Publication Data

US 2024/0267926 A1 Aug. 8, 2024

Related U.S. Application Data

(63) Continuation of application No. 17/312,945, filed as application No. PCT/EP2019/086012 on Dec. 18, 2019, now Pat. No. 11,968,684.

(30) Foreign Application Priority Data

Dec. 20, 2018 (EP) .................................. 18214782

(51) Int. Cl.
 *H04W 72/14* (2009.01)
 *H04W 72/04* (2023.01)
 (Continued)

(52) U.S. Cl.
 CPC ......... *H04W 72/23* (2023.01); *H04W 72/044* (2013.01); *H04W 72/1263* (2013.01)

(58) Field of Classification Search
 CPC .......... H04W 72/044; H04W 72/1263; H04W 72/1268; H04W 72/20; H04W 72/23;
 (Continued)

(56) References Cited

U.S. PATENT DOCUMENTS

2012/0250631 A1  10/2012 Hakola et al.
2016/0227560 A1  8/2016 Webb et al.
(Continued)

FOREIGN PATENT DOCUMENTS

CN  107439049 A  12/2017
CN  108322939 A  7/2018
(Continued)

OTHER PUBLICATIONS

Nokia, Nokia Shanghai Bell, R2-1814216 "BSR at QoS flow relocation" 3GPP tsg_ran\wg2_rl2,tsgr2_103bis Sep. 28, 2018.
(Continued)

*Primary Examiner* — Awet Haile
(74) *Attorney, Agent, or Firm* — XSENSUS LLP

(57) ABSTRACT

A method for transmitting data by a communications device in a cell of a wireless communications network, the method comprising receiving an indication of a plurality of configured grants, each of the configured grants allocating a sequence of communications resources for the transmission of the data in the cell by the communications device, receiving an indication of a mapping between each of a plurality of logical channels and one or more of the plurality of configured grants, and transmitting a first portion of the data associated with a first logical channel of the plurality of logical channels using communications resources allocated by one of the plurality of configured grants, in accordance with the mapping.

20 Claims, 9 Drawing Sheets

(51) Int. Cl.
*H04W 72/044* (2023.01)
*H04W 72/12* (2023.01)
*H04W 72/1263* (2023.01)
*H04W 72/23* (2023.01)

(58) Field of Classification Search
CPC . H04W 72/51; H04W 72/0453; H04W 68/02; H04W 76/27; H04W 48/12; H04W 72/232; H04W 72/535; H04W 76/11; H04W 92/02; H04W 92/10; H04L 1/1874; H04L 5/0098
See application file for complete search history.

(56) References Cited

U.S. PATENT DOCUMENTS

| | | | |
|---|---|---|---|
| 2018/0124829 A1 | 5/2018 | Lee | |
| 2019/0045491 A1* | 2/2019 | Zhang | H04W 72/232 |
| 2020/0092833 A1 | 3/2020 | Agiwal et al. | |
| 2021/0258980 A1* | 8/2021 | Luo | H04W 28/0268 |
| 2021/0329593 A1 | 10/2021 | Lee et al. | |
| 2021/0385017 A1* | 12/2021 | Kuo | H04L 5/0032 |
| 2021/0410177 A1* | 12/2021 | Takeda | H04W 72/23 |
| 2024/0314793 A1* | 9/2024 | Pelletier | H04W 72/23 |

FOREIGN PATENT DOCUMENTS

| | | |
|---|---|---|
| CN | 108476507 A | 8/2018 |
| CN | 108810927 A | 11/2018 |
| IN | 42/2017 A | 10/2017 |
| WO | 2018/036097 A1 | 3/2018 |
| WO | 2020/065870 A1 | 4/2020 |

OTHER PUBLICATIONS

International Search Report and Written Opinion mailed on Feb. 25, 2020, received for PCT Application No. PCT/EP2019/086012, Filed on Dec. 18, 2019, 12 pages.

Huawei et al., "Discussion on NR support for multiple active UL configured grants", 3GPP TSG-RAN WG2 # 104, R2-1818202, Spokane, USA, Nov. 12-16, 2018, 3 Pages.

Zte et al., "Uu enhancements for NR V2X", 3GPP TSG-RAN WG2#104, R2-1816983, Spokane, USA, Nov. 12-16, 2018, 3 Pages.

Ericsson, "On support for deterministic periodic traffic with configured grants", R2-1817174, 3GPP TSG-RAN WG2 #104, Spokane, USA, Nov. 12-16, 2018, 6 Pages.

Charter Communications, "UL BWP Management in NR-U", 3GPP TSG RAN WG1 Meeting #95, R1-1813378, Spokane, Washington, Nov. 12-16, 2018, 3 Pages.

3GPP, "LS on multiple active configured grant configurations", 3GPP TSG RAN WG2#104, R2-1818991, Spokane, USA, Nov. 12-16, 2018, 1 Page.

3GPP, "NR; NR and NG-RAN Overall Description", Release 15, 3GPP TS 38.300 V15.2.0, Jun. 2018, pp. 1-87.

Holma et al., "LTE for UMTS OFDMA and SC-FDMA Based Radio Access", System Architecture Based on 3GPP SAE, 2009, pp. 25-27.

3GPP, "NR; Physical Layer procedures for data", Release 15, ETSI TS 138 214 V15.3.0, Oct. 2018, pp. 1-98.

3GPP, "Study on NR Industrial Internet of Things (IoT)", Release 16, 3GPP TR 38.825 VO.0.1, Nov. 2018, 12 pages.

3GPP, "NR Physical Layer Procedures for data", Release 15, 3GPP TS 38.214, V15.3.0, Sep. 2018, 96 pages.

Nokia et al., Revised SID: Study on NR Industrial Internet of Things (IoT), 3GPP TSG RAN Meeting #81, RP-182090, Gold Coast, Australia, Sep. 10-13, 2018, 5 pages.

3GPP, "Study on Scenarios and Requirements for Next Generation Access Technologies", Release 14, 3GPP TR 38.913, V14.3.0, Jun. 2017, 39 pages.

Huawei et al., "New SID on Physical Layer Enhancements for NR Ultra-Reliable and Low Latency Communication (URLLC)", 3GPP TSG-RAN #81, RP-182089, (Rev of RP-181678), Gold Coast, Australia, Sep. 10-13, 2018, 5 pages.

Samsung Electronics R&D Institute UK, "On logical channel SR masking in NR": amp, R2-180956,4 Gpp tsg_ran\wg2_rl2,tsgr2_ahs, Jul. 2018.

* cited by examiner

COMMUNICATIONS DEVICE, INFRASTRUCTURE EQUIPMENT AND METHODS

CROSS-REFERENCE TO RELATED APPLICATIONS

The present application is a continuation of U.S. application Ser. No. 17/312,945, filed Jun. 11, 2021, which is based on PCT filing PCT/EP2019/086012, filed Dec. 18, 2019, which claims priority to EP 18214782.7, filed Dec. 20, 2018, the entire contents of each are incorporated herein by reference.

BACKGROUND

Field

The present disclosure relates to communications devices, infrastructure equipment and methods for the transmission of data by a communications device in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Another example of such a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of communications devices associated with different traffic profiles gives rise to new challenges for efficiently handling communications in wireless telecommunications systems that need to be addressed.

SUMMARY

The present disclosure can help address or mitigate at least some of the issues discussed above.

Embodiments of the present technique can provide a method for transmitting data by a communications device in a cell of a wireless communications network, the method comprising receiving an indication of a plurality of configured grants, each of the configured grants allocating a sequence of communications resources for the transmission of the data in the cell by the communications device, receiving an indication of a mapping between each of a plurality of logical channels and one or more of the plurality of configured grants, and transmitting a first portion of the data associated with a first logical channel of the plurality of logical channels using communications resources allocated by one of the plurality of configured grants, in accordance with the mapping.

Embodiments of the present technique, which further relate to communications devices, infrastructure equipment, methods of operating infrastructure equipment and circuitry for communications devices and infrastructure equipment, allow for efficient and timely transmission of high priority data.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
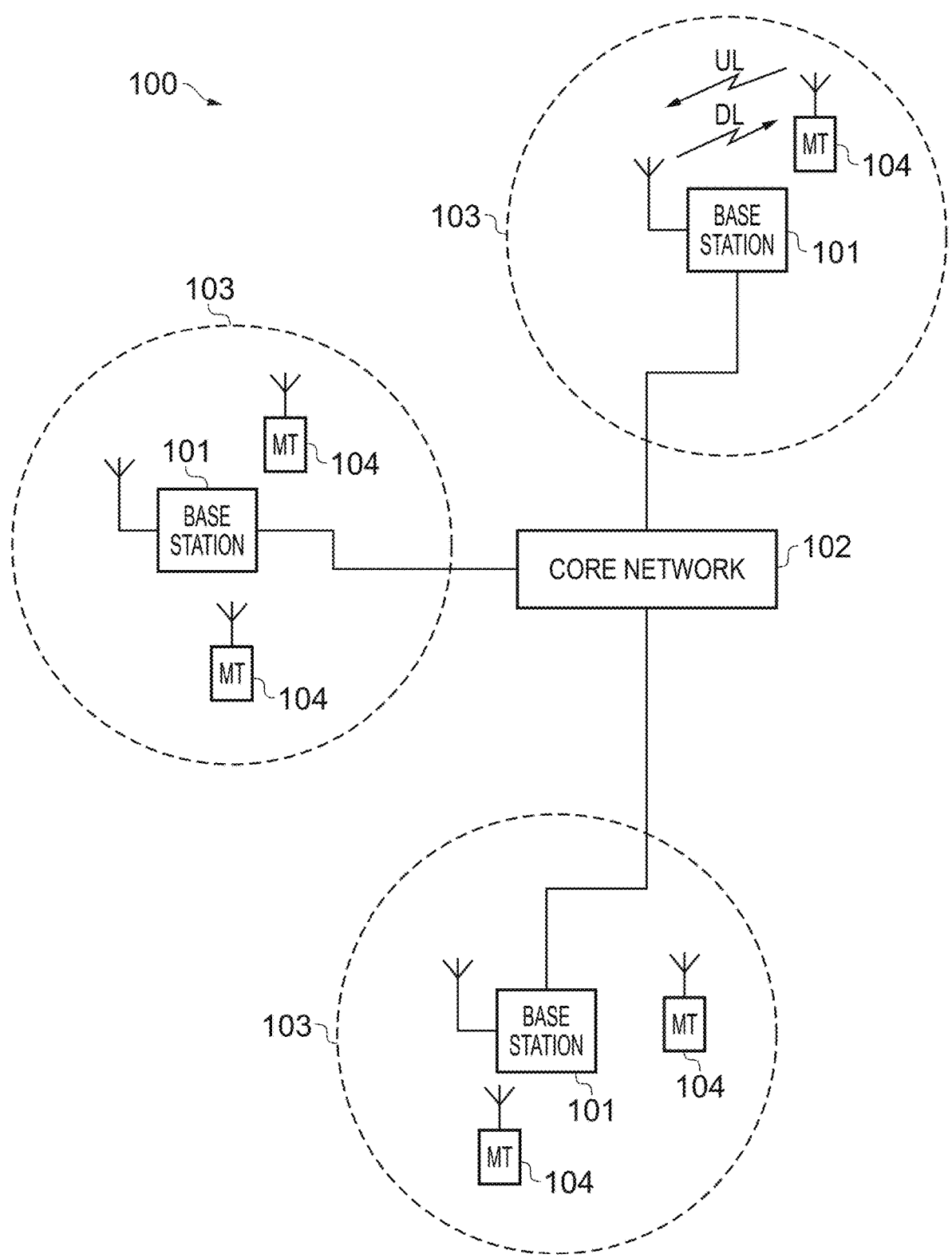
FIG. 1 schematically represents some aspects of a LTE-type wireless telecommunication system which may be configured to operate in accordance with example embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104, and within which a communications device may obtain service. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, example embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
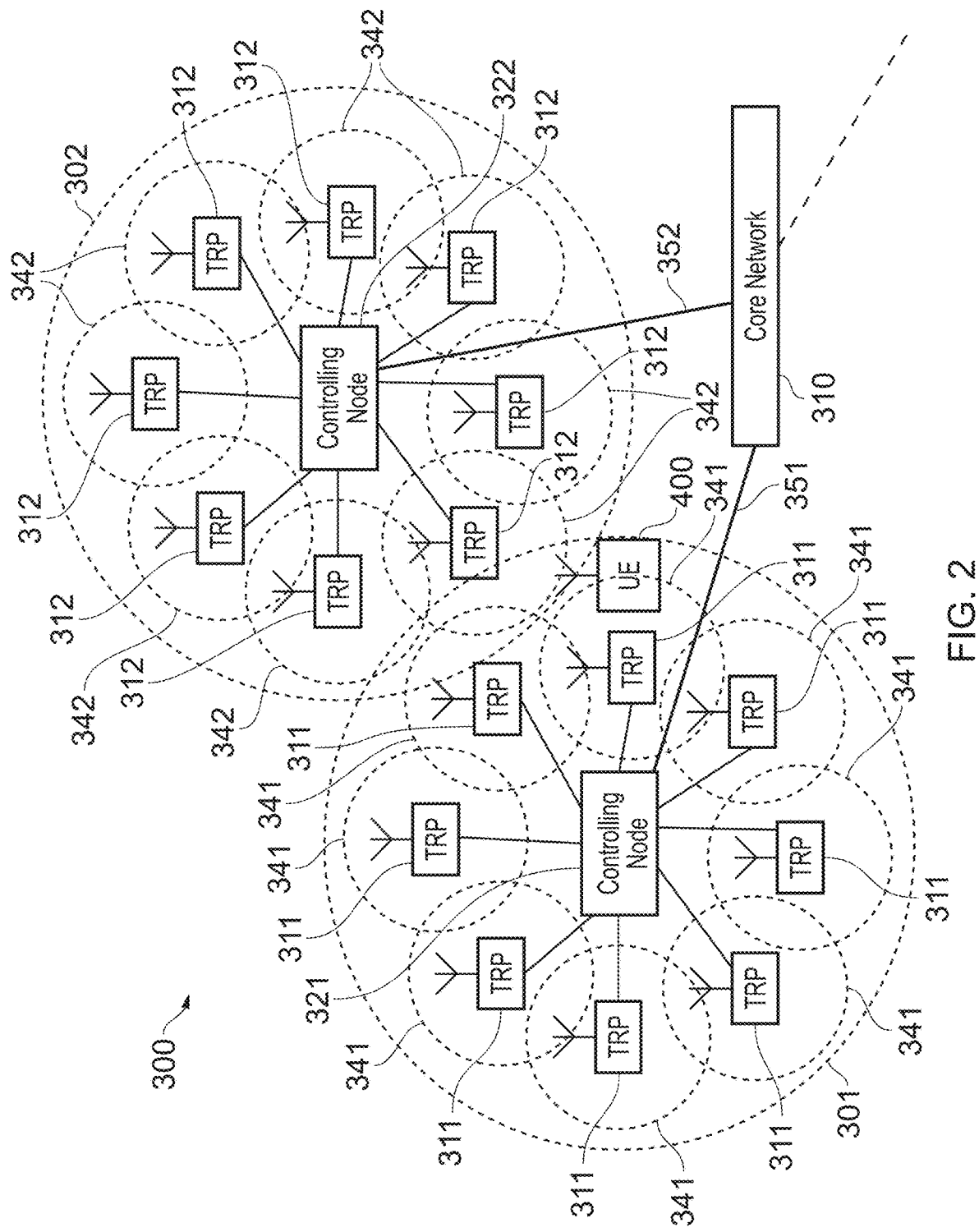
FIG. 2 schematically represents some example aspects of a new radio access technology (RAT) wireless communications network which may be configured to operate in accordance with embodiments of the present disclosure.

FIG. 2 is a schematic diagram illustrating a network architecture for a new RAT wireless communications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for communications devices connected to the network. Each distributed unit 311, 312 has a coverage area (radio access footprint) 341, 342 which together define the coverage of the respective communication cells 301, 302. Each distributed unit 311, 312 includes transceiver circuitry for transmission and reception of wireless signals and processor circuitry configured to control the respective distributed units 311, 312.

In terms of broad top-level functionality, the core network component 310 of the new RAT communications network represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device 400 is represented in FIG. 2 within the coverage area of the first communication cell 301. This communications device 400 may thus exchange signaling with the first controlling node 321 in the first communication cell via one of the distributed units 311 associated with the first communication cell 301. In some cases communications for a given communications device are routed through only one of the distributed units, but it will be appreciated in some other implementations communications associated with a given communications device may be routed through more than one distributed unit, for example in a data duplication scenario and other scenarios.

The particular distributed unit(s) through which a communications device is currently connected through to the associated controlling node may be referred to as active distributed units for the communications device. Thus the active subset of distributed units for a communications device may comprise one or more than one distributed unit (TRP). The controlling node 321 is responsible for determining which of the distributed units 311 spanning the first communication cell 301 is responsible for radio communications with the communications device 400 at any given time (i.e. which of the distributed units are currently active distributed units for the communications device). Typically this will be based on measurements of radio channel conditions between the communications device 400 and respective ones of the distributed units 311. In this regard, it will be appreciated that the subset of the distributed units in a cell which are currently active for a communications device will depend, at least in part, on the location of the communications device within the cell (since this contributes significantly to the radio channel conditions that exist between the communications device and respective ones of the distributed units).

In at least some implementations the involvement of the distributed units in routing communications from the communications device to a controlling node (controlling unit) is transparent to the communications device 400. That is to say, in some cases the communications device may not be aware of which distributed unit is responsible for routing communications between the communications device 400 and the controlling node 321 of the communication cell 301 in which the communications device is currently operating, or even if any distributed units 311 are connected to the controlling node 26 and involved in the routing of communications at all. In such cases, as far as the communications device is concerned, it simply transmits uplink data to the controlling node 321 and receives downlink data from the controlling node 26 and the communications device has no awareness of the involvement of the distributed units 311, though may be aware of radio configurations transmitted by distributed units 311. However, in other embodiments, a communications device may be aware of which distributed unit(s) are involved in its communications. Switching and scheduling of the one or more distributed units may be done at the network controlling node based on measurements by the distributed units of the communications device uplink signal or measurements taken by the communications device and reported to the controlling node via one or more distributed units.

In the example of FIG. 2, two communication cells 301, 302 and one communications device 400 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIG. 1 and FIG. 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 321, 322 and/or a TRP 311, 312 of the kind shown in FIG. 2 which is adapted to provide functionality in accordance with the principles described herein.

The embodiments of the present invention can find application with advanced wireless communications systems such as those referred to as 5G or New Radio (NR) Access Technology.

The elements of the wireless access network shown in FIG. 1 may be equally applied to a 5G new RAT configuration, except that a change in terminology may be applied as mentioned above.

Figure 3:
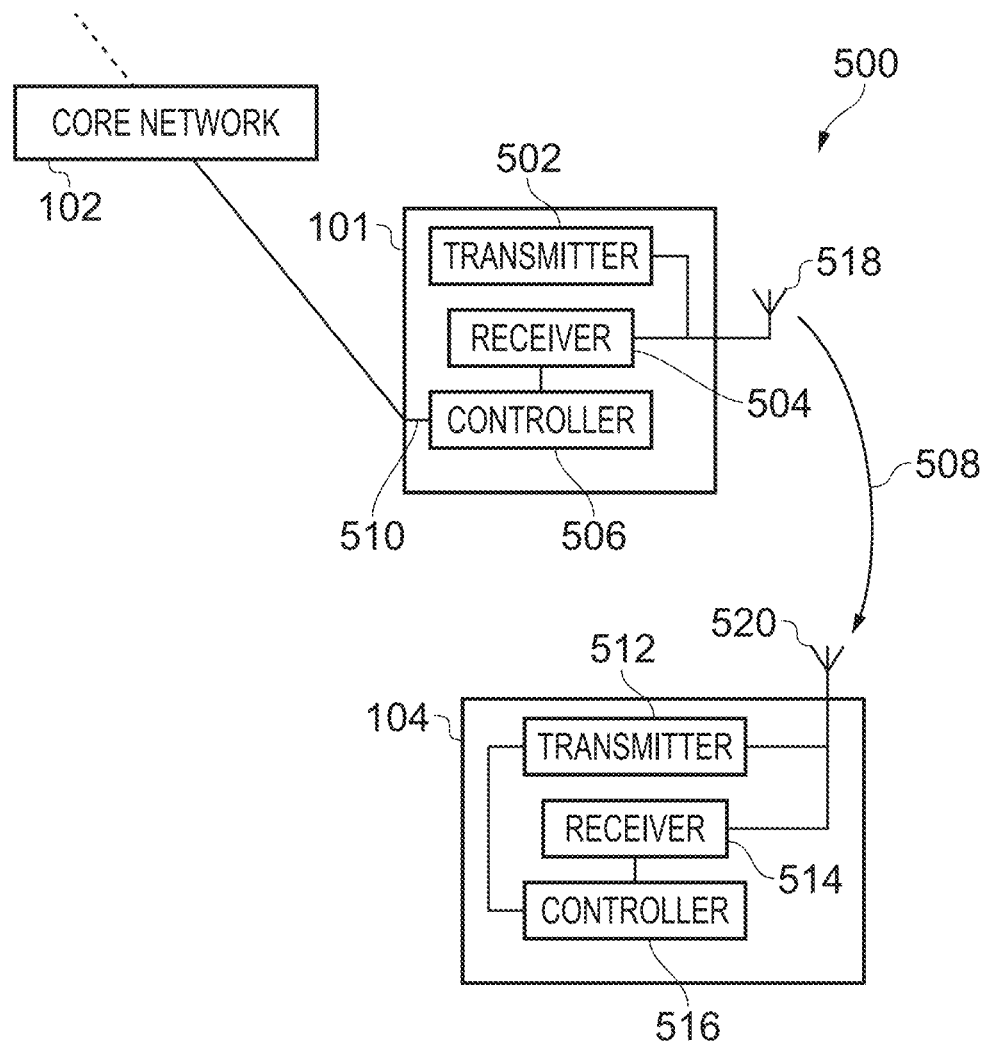
FIG. 3 schematically shows a telecommunications system according to an embodiment of the present disclosure.

FIG. 3 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part 102 coupled to a radio network part. The radio network part comprises the infrastructure equipment (which may be an evolved-nodeB) 101 coupled, via a wireless access interface illustrated generally by arrow 508, to a communications device 104, which may also be referred to as a terminal device. It will of course be appreciated that in practice the radio network part may comprise a plurality of base stations serving a larger number of communications devices across various communication cells. However, only a single infrastructure equipment and single communications device are shown in FIG. 3 in the interests of simplicity.

As noted above, the operation of the various elements of the communications system 500 shown in FIG. 3 may be broadly conventional apart from where modified to provide functionality in accordance with embodiments of the present disclosure as discussed herein.

The infrastructure equipment 101 is connected to the core network 102 via an interface 510 to a controller 506. The infrastructure equipment 101 includes a receiver 504 connected to an antenna 518 and a transmitter 502 connected to the antenna 518. The receiver 504 and the transmitter 502 are both connected to the controller 506. The controller 506 is configured to control the infrastructure equipment 101 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 506 may comprise circuitry which is suitably configured/programmed to provide the desired functionality using conventional programming/configuration techniques for equipment in wireless telecommunications systems. The transmitter 502, receiver 504 and controller 506 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 101 will in general comprise various other elements associated with its operating functionality.

Correspondingly, the communications device 104 includes a controller 516 connected to a receiver 514 which receives signals from an antenna 520. The controller 516 is also connected to a transmitter 512 which is also connected to the antenna 520. The controller 516 is configured to control the communications device 104 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 516 may comprise circuitry which is suitably configured/programmed to provide the desired functionality using conventional programming/configuration techniques for equipment in wireless telecommunications systems. The transmitter 512, receiver 514 and controller 516 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 104 will in general comprise various other elements associated with its operating functionality, for example a power source, user interface, and so forth, but these are not shown in FIG. 3 in the interests of simplicity.

5G, URLLC and Industrial Internet of Things

Systems incorporating NR technology are expected to support different services (or types of services), which may be characterised by different requirements for latency, data rate and/or reliability. For example, Enhanced Mobile Broadband (eMBB) services are characterised by high capacity with a requirement to support up to 20 Gb/s. The requirements for Ultra Reliable & Low Latency Communications (URLLC) [1] services are for a reliability of $1-10^{-5}$ (99.999%) or higher for one transmission of a 32 byte packet with a user plane latency of 1 ms [3]. In some scenarios, there may be a requirement for a reliability of $1-10^{-6}$ (99.9999%) or higher. Massive Machine Type Communications (mMTC) is another example of a service which may be supported by NR-based communications networks.

In addition, systems may be expected to support further enhancements related to Industrial Internet of Things (IIoT) in order to support services with new requirements of high availability, high reliability, low latency, and in some cases, high-accuracy positioning.

Industrial automation, energy power distribution and intelligent transport systems are examples of new use cases for Industrial Internet of Things (IIoT). In an example of industrial automation, the system may involve different distributed components working together. These components may include sensors, virtualized hardware controllers and autonomous robots, which may be capable of initiating actions or reacting to critical events occurring within a factory and communicating over a local area network. The local area network may handle messages which are time sensitive and have strict time deadlines, and may thus be referred to as a time sensitive network (TSN). Some parts of this TSN network can be interconnected by 5G wireless system (5GS). The UEs/equipment in a TSN network may be expected to handle a mixture of the following different traffic [5]:

Multiple periodic streams, of different periodicities, of different priorities, for example multiple streams coming from different applications Aperiodic critical priority traffic that is the result of critical events, like alarms, safety detectors that need to be informed about the occurrence of a critical event Best effort type of traffic such as eMBB traffic, internet traffic, or any other traffic supporting factory operations.

Details of possible use cases and scenarios may be found in [5].

The UEs/equipment in the network may therefore be expected to handle a mixture of different traffic, for example, associated with different applications and potentially different quality of service requirements (such as maximum latency, reliability, packet sizes, throughput).

In order to permit a communications device to transmit data associated with multiple traffic classes in a timely manner, multiple configured grants/semi-persistent scheduling (SPS) grants may be required in order to provide more flexibility while avoiding excessive dynamic downlink control signalling.

It has been suggested [6] that multiple active configured grants allocating resources in a given bandwidth part (BWP) of a serving cell can be supported simultaneously at least for different services/traffic types and/or for enhancing reliability and reducing latency.

There is therefore a need to ensure that a communications device can be appropriately configured to transmit data using resources associated with one or more configured grants in an appropriate manner, respecting the quality of service requirements for the data.

According to embodiments of the present disclosure, there is provided a method for transmitting data by a communications device in a cell of a wireless communications network, the method comprising receiving an indication of a plurality of configured grants, each of the configured grants allocating a sequence of communications resources for the transmission of the data in the cell by the communications device, receiving an indication of a mapping between each of a plurality of logical channels and one or more of the plurality of configured grants, and transmitting a first portion of the data associated with a first logical channel of the plurality of logical channels using communications resources allocated by one of the plurality of configured grants, in accordance with the mapping.

As a result, the communications device may transmit high priority data making using of communications resources allocated by the wireless communications network in an efficient manner.

Figure 4:
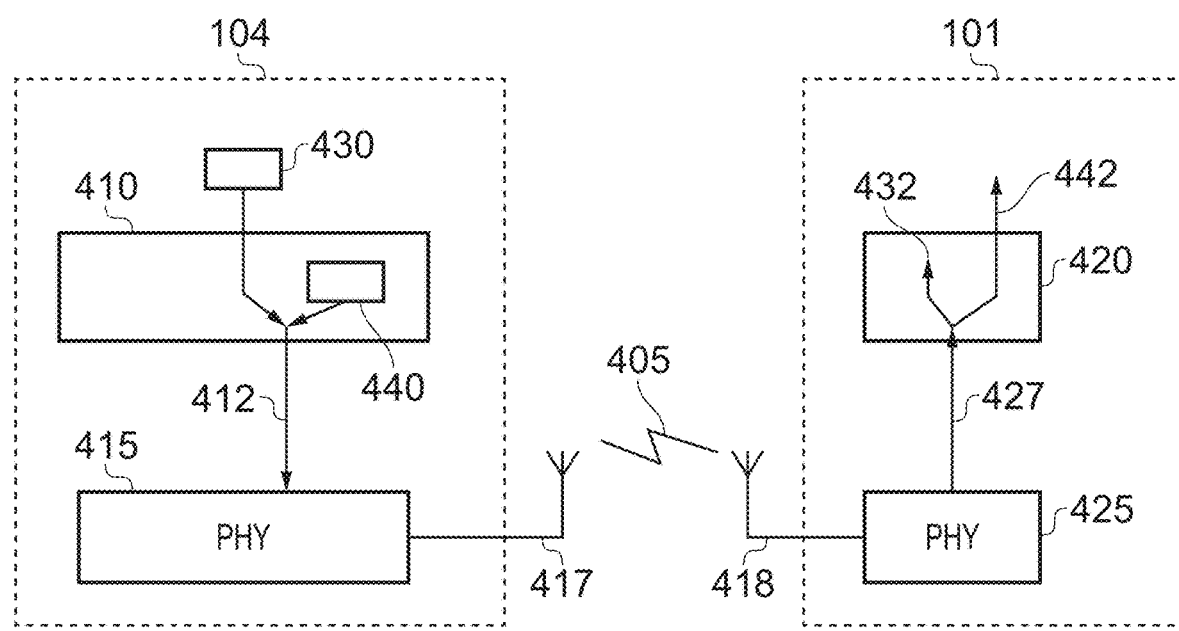
FIG. 4 illustrates an example of an arrangement of protocol layer entities within a communications device and an infrastructure equipment which may be configured in accordance with embodiments of the present technique.

FIG. 4 illustrates an example of an arrangement of protocol layer entities within the communications device 104 and the infrastructure equipment 101 which may be configured in accordance with embodiments of the present technique.

In the example of FIG. 4, protocol entities 410 and 420 are corresponding protocol entities at the same protocol layer, in the communications device 104 and the infrastructure equipment 101 respectively. With respect to the protocol entity 410, the data 430 which is received from a higher layer protocol entity (not shown) at the protocol entity 410 in the communications device 104 for transmission may be considered as user plane data. The protocol entity 410 may process the user plane data 430 in some manner (e.g. by segmentation, encoding, forming into protocol data units, associating with sequence numbers, etc.) before passing it to lower layers for transmission.

In contrast, control plane data 440 is generated by the protocol entity 410 in the communications device 104 for transmission to the peer protocol entity 420 of the infrastructure equipment. The protocol entity 410 may process the control plane data in a manner similar to that used for user plane data, before either passing it to lower layers for any further processing and transmission.

FIG. 4 shows physical layer (PHY) protocol entities 415, 425 in the communications device 104 and infrastructure equipment 101 respectively. The PHY protocol entities 415, 425 may be at the lowest level of the protocol hierarchy and may generate signals representing the data for transmission on the wireless access interface 405 and may decode signals representing the data received on the wireless access interface 405. The signals representing the data may be transmitted and received via one or more antennae 417, 418.

At the communications device 104, both the control plane data 440 and the user plane data 430 are passed to the lower layers, and ultimately to physical layer (PHY) protocol entities 415, 425. The control plane data 440 and the user plane data 430 are passed to the lower layers by the protocol entity 410 as indicated by the single arrow 412.

At the infrastructure equipment 104, the protocol entity 420 which is the peer entity of the protocol entity 410 receives the control plane data 440 and the user plane data 430 from a protocol entity at a lower layer. Both may be passed by the PHY protocol entity 425 to higher layers and ultimately to the peer protocol entity 420.

At the peer protocol entity 420, it is determined that the control plane data 440 is destined for the protocol entity 420, and is therefore processed in accordance with the protocol rules by which the protocol entities 410 and 420 operate, without being passed to higher layer protocol entities, as indicated by the arrow 432. The user plane data 430 is determined to be destined for a higher layer protocol entity, and is therefore processed in accordance with the protocol rules by which the protocol entities 410 and 420 operate in respect of user plane data; for example, this may involve performing decoding, reassembly, and/or generating acknowledgement information, before being passed to higher layer protocol entities, as indicated by the arrow 442.

In the example of FIG. 4, the protocol entity 420 which is the peer of the protocol entity 410 of the communications device 104 is shown as being within the infrastructure equipment 101. However, as described above, some protocol layers may be terminated (that is, have the peer entity corresponding to the protocol entity of the communications device 104) at other equipment within, or outside of, the wireless communications network.

MAC Transport Block

Data may be transmitted by the communications device 104 using uplink communications resources using a medium access control (MAC) transport block (TB). Each MAC TB is constructed at a MAC protocol layer (which may be the protocol entity 410 of FIG. 4) in response to determining that uplink communications resources are, or will be, scheduled for the communications device and that data is available for uplink transmission.

Once the MAC TB is constructed, it may be passed from the MAC protocol layer to the PHY protocol entity (such as the PHY protocol entity 415 illustrated in FIG. 4) for transmission on the wireless access interface to the infrastructure equipment 101.

Bandwidth Part

A communications device and an infrastructure equipment, such as the communications device 104 and infrastructure equipment 101 of FIG. 1, are configured to communicate via a wireless access interface. The wireless access interface may comprise one or more carriers, each providing, within a range of carrier frequencies, communications resources for transmitting and receiving signals according to a configuration of the wireless access interface. The one or more carriers may be configured within a system bandwidth provided for the wireless communications network of which the infrastructure equipment 101 forms part. Each of the carriers may be divided in a frequency division duplex scheme into an uplink portion and a downlink portion and may comprise one or more bandwidth parts (BWPs). A carrier may be configured therefore with a plurality of different BWP for a communications device to transmit or receive signals.

The nature of the wireless access interface may be different amongst the different BWPs. For example, where the wireless access interface is based on orthogonal frequency division multiplexing, different BWPs may have different sub-carrier spacing, symbol periods and/or cyclic prefix lengths. BWPs may have different bandwidths.

By configuring BWPs appropriately, the infrastructure equipment may provide BWPs which are suited for different types of services. For example, a BWP more suitable for eMBB may have a larger bandwidth in order to support high data rates. A BWP suited for URLLC services may use a larger sub-carrier spacing and shorter slot durations, in order to permit lower latency transmissions.

On the other hand, where less stringent latency requirements apply, but high reliability is desired, a BWP having lower sub-carrier spacing may be selected for improved tolerance of frequency selective fading.

In some scenarios, the frequency range of one or more BWPs collectively span the system bandwidth (in other words, all frequencies in the system bandwidth may fall within at least one BWP). A frequency range of a BWP may be entirely within the frequency range of another BWP.

An activated BWP refers to a BWP which may be used for the transmission or reception of data to or from the communications device 104. An infrastructure equipment may schedule transmissions to or by the communications device 104 only on a BWP if that BWP is currently activated for the communications device 104.

On deactivated BWPs, the communications device 104 may not monitor a PDCCH and may not transmit on PUCCH, PRACH and UL-SCH.

Conventionally at most one BWP providing uplink communications resources and at most one BWP providing downlink communications resources may be activated at any given time in respect of a particular communications device.

In light of the differing parameters which may be applicable to BWPs, a single activated BWP may not be suitable for the transmission of data associated with different services, if those different services have different requirements (e.g. latency requirements) or characteristics (e.g. bandwidth/data rate). Prior to being activated, a BWP may be configured for use by the communications device 104. That is, the communications device 104 may determine the characteristics of the BWP, for example, by means of radio resource control (RRC) signalling transmitted by the infrastructure equipment 101.

Grant Based and Grant Free Resources

In a conventional uplink transmission, when data arrives from upper protocol layers at a buffer at the medium access control (MAC) protocol layer of the communications device, the communications device may transmit, in response, a Scheduling Request (SR) to the network if the communications device has no uplink transmission/resources scheduled. The communications device may transmit a buffer status report (BSR), indicating an amount of data in the MAC layer buffer(s). In response to receiving the SR or BSR, the network (for example, the infrastructure equipment 101) may send an Uplink Grant carried by downlink control information (DCI) to the communications device 104. The DCI may be transmitted on a physical downlink control channel (PDCCH).

The Uplink Grant may comprise an indication of uplink communications resources which are allocated (or, in other words, scheduled) for the communications device to transmit its uplink data. The uplink communications resources may be on a physical uplink shared channel (PUSCH). A resource allocation of this type, where resources are allocated on an ad-hoc, one-off basis, may be known as a grant based resource or 'dynamic grant' (DG). Grant based resources are suitable for services where the data arrives in variable amounts, and/or is aperiodic, even if the data traffic arrival follows a somewhat predictable traffic pattern. DGs may be signalled at the MAC layer.

On the other hand, grant free resources are a set of periodically repeating uplink communications resources which are semi-statically configured by the network for the use of the communications device for uplink transmission. Such resources may also be referred to as a 'configured grant' (CG). Grant free resource allocation (which may also be referred to as 'semi-persistent scheduling' (SPS)) is particularly suitable for services that generate periodic data traffic, where the amount generated is broadly constant over time. CGs may be signalled at a radio resource control (RRC) layer.

Grant free resources can improve the efficiency with which communications resources are used, since there is no need for either a SR or uplink grant to be transmitted in respect of each uplink data transmission.

Resource allocations may thus be provided in accordance with quality of service requirements associated with particular services. Where a single communications device generates data for transmission which comprises data associated with different quality of service requirements, for example because it is associated with different services, the communications device may receive multiple resource allocations. These multiple resource allocations may comprise zero, one or more dynamic grants, and zero, one or more configured grants.

A communications device may thus have multiple active grants. Communications resources allocated by these grants may in some instances coincide, for example in the time domain, the frequency domain, or both.

Figure 5:
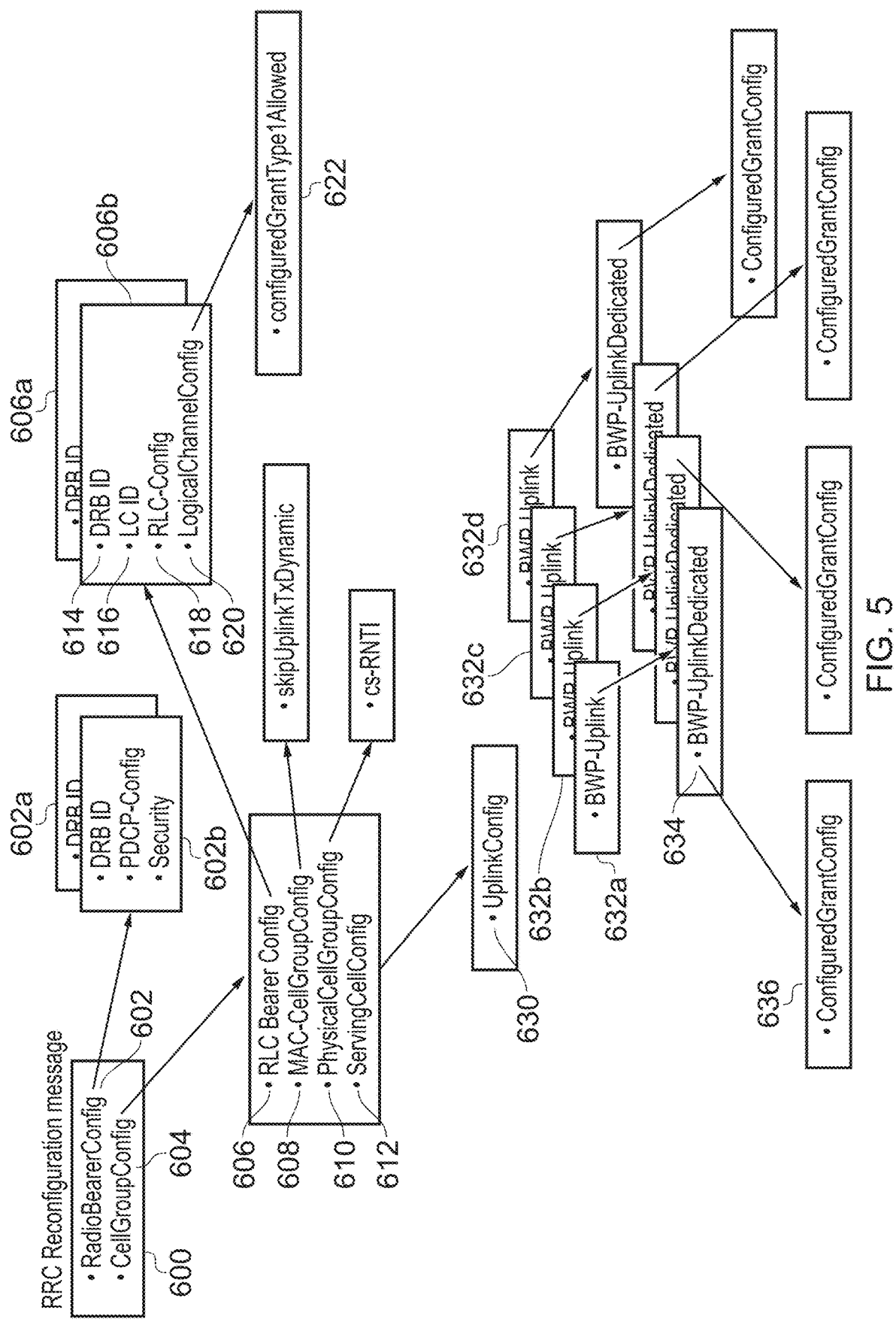
FIG. 5 illustrates a structure of a conventional RRC Reconfiguration message.

FIG. 5 illustrates a structure of a conventional RRC Reconfiguration message 600. For clarity and conciseness, only the contents of the RRC Reconfiguration message 600 which are relevant to the present disclosure are shown and described herein.

In FIG. 5 and other similar figures, messages are represented in hierarchical format, in which an information element (IE) or message is represented by a box, and an arrow pointing from label A to box B indicates that label A refers to an information element, the contents of which are enumerated in box B. Where an arrow points to multiple 'stacked' boxes, then this indicates that multiple instances of the information element may be present. Information elements and their contents may be referred to as message elements.

It will be appreciated that the RRC Reconfiguration message 600 may contain other contents, which are not shown. Further details of a conventional RRC Reconfiguration message may be found, for example, in the 3GPP specification 3GPP TS 38.331 Release 15.

The RRC Reconfiguration message 600 comprises a RadioBearerConfig information element (IE) 602 and a CellGroupConfig IE 604. In the example shown in FIG. 5, the RRC Reconfiguration message 600 contains two instances of the RadioBearerConfig IE 602, indicated by numerals 602a and 602b. In general, the RadioBearerConfig IE 602 may comprise parameters associated with a Radio Bearer, such as a Data Radio Bearer identity (DRB ID), packet data convergence protocol (PDCP) configuration parameters, and security parameters for the operation of the Radio Bearer.

The CellGroupConfig IE 604 contains parameters associated with a group of one or more cells, which may include a serving cell. These may include, within a MAC-CellGroupConfig IE 608, parameters characterising the behaviour of a MAC protocol entity (which may be the protocol entity 410) for the cell(s), and parameters for one or more logical channels. Each logical channel has an associated radio link control (RLC) protocol entity associated with it and parameters for the control of the RLC protocol entity behaviour are also contained within the CellGroupConfig IE 604.

The CellGroupConfig IE 604 therefore contains an instance of an RLC Bearer Config IE 606 providing parameters for the operation of each RLC protocol entity which is to be established, in addition to one instance of the MAC-CellGroupConfig IE 608, one instance of a PhysicalCellGroupConfig IE 610, and one instance of a ServingCellConfig IE 612. The ServingCellConfig IE 612 may include parameters associated with a single cell, such as whether the cell is configured with one or more bandwidth parts for the communications device 104.

Each RLC protocol entity may be associated with a logical channel, which in turn may be used for the transmission of data associated with a particular radio bearer. Therefore in the RLC Bearer Config IE 606 there may be an indication of a data radio bearer identity (DRB ID) 614 corresponding to the value of a DRB ID in an instance of the RadioBearerConfig IE 602.

The RLC Bearer Config IE 606 may also include a logical channel identity (LCID) 616, parameters describing the behaviour of the RLC protocol entity in an RLC-Config IE 618 and configuration parameters associated with the logical channel in a LogicalChannelConfig IE 620. In the example of FIG. 5 the RLC Reconfiguration message 600 indicates that two RLC protocol entities are to be established by the inclusion of two instances 606a, 606b of the RLC Bearer Config IE 606.

Within the ServingCellConfig IE 612, there may be provided parameters associated with the communication resources for uplink transmission by the communications device 104 to the infrastructure element 101. These may be provided within an UplinkConfig IE 630. The UplinkConfig IE 630 may be used to indicate that one or more bandwidth parts are configured in the cell for the transmission of the uplink data by the communications device 104, by the inclusion of an instance of a BWP-Uplink IE 632 for each configured BWP. In the example of FIG. 5, the UplinkConfig IE 630 comprises four instances of the BWP-Uplink IE 632a, 632b, 632c and 632d, each of which provides parameters associated with a separate BWP. It should be noted that according to conventional techniques multiple BWPs may be configured within an RLC configuration message 600, however only one BWP may be active at any given time.

Within each respective instance of the BWP-Uplink IE 632 there may be provided (for example, within a BWP-UplinkDedicated IE 634) a description of configured grant resources within the communications resources provided by the respective BWP, by means of a ConfiguredGrantConfig IE 636. Parameters characterising a configured grant may include start time, duration, periodicity and frequency range (e.g. in terms of physical resource blocks).

The ConfiguredGrantConfig information element 636 may indicate whether the resources are for a configured grant of type 1 or of type 2. That is, whether the periodic resources are available at all times while the present RRC configuration is valid (type 1 configured grant), or whether the periodic resources may be temporarily activated and deactivated by means of control signalling (type 2).

The communication resources provided by means of a configured grant may be the same or different across each of the configured BWPs.

Each logical channel, and thus each RLC protocol entity may be associated with quality of service parameters. As such, communication resources allocated for each logical channel may differ according to the respective quality of service parameters required or associated with that logical channel. For some logical channels, the quality of service requirements may justify the use of configured grant resources. For other logical channels, particularly those where traffic is not periodic, the use of configured grant resources may not be appropriate. The RLC Reconfiguration message 600 indicates by means of a ConfiguredGrantType1Allowed indication 622, which is associated with each logical channel, and thus with each RLC protocol entity, whether it is permitted for data associated with that logical channel to be transmitted using communication resources of a configured grant. The ConfiguredGrantType1Allowed indication 622 may form a part of the LogicalChannelConfig IE 620. As such the ConfiguredGrantType1Allowed indication 622 can be set for each logical channel independently.

Figures 6, 7:
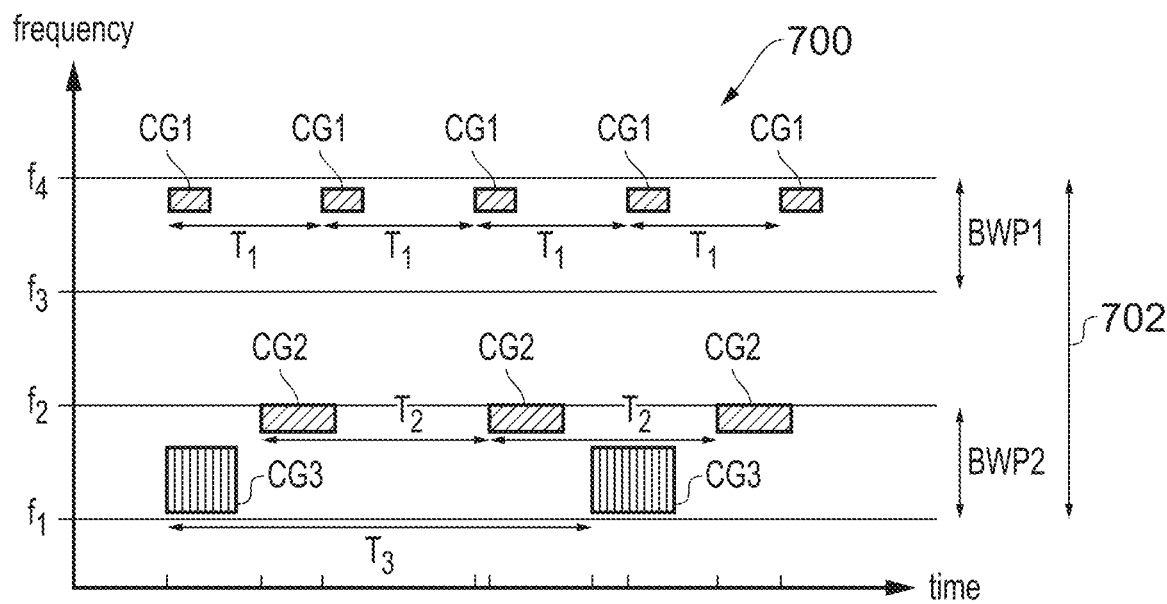
FIG. 6 illustrates uplink communication resources on a wireless access interface in accordance with embodiments of the present technique.
FIG. 7 illustrates a example mapping, in accordance with embodiments of the present technique, between logical channels and CGs.

FIG. 6 illustrates uplink communication resources on a wireless access interface 700 in accordance with embodiments of the present technique.

The uplink of the wireless access interface 700 comprises communications resources within a system bandwidth 702, which extends from frequency f1 to frequency f4. In the example of FIG. 6 the communications device 104 is configured with a first bandwidth part BWP1 and a second bandwidth part BWP2. The second bandwidth part BWP2 extends from frequency f1 to frequency f2, and the first bandwidth part BWP1 extends from frequency f3 to frequency f4.

Within the first bandwidth part BWP1 a first CG CG1 is configured, comprising communications resources which are periodic have a periodicity of T1.

Within the second bandwidth part, BWP 2, there is configured a second CG, CG2, and a third CG, CG3. The second CG CG2 comprises communications resources which are periodic have a periodicity of T2. The third CG CG3 comprises periodic communications resources having a periodicity of T3, where in the example of FIG. 6, T3>T2>T1.

It will be appreciated that the instances of communications resources allocated by the third CG, CG3 are separated further apart in time but provide greater communications resources than any instance of either the first or second CGs CG1, CG2. As such, for example the third CG CG3 may be suitable for a service which requires a large quantity of data to be transmitted relatively infrequently or with a lenient latency requirement. On the other hand, the first CG, CG1, may be more appropriate for the low latency transmission of smaller quantities of data.

FIG. 7 illustrates an example mapping 806 in accordance with embodiments of the present technique between logical channels and CGs.

According to the mapping in FIG. 7 each of the logical channel IDs 802 is associated with zero, one or more CGs 804. The CGs 804 may for example correspond to the first, second and third CG, CG1, CG2, CG3 illustrated in FIG. 6 and described above. In the example of FIG. 7 the first logical channel having a logical channel ID (LCID) equal to '1' is mapped to the first and second CGs, CG1 and CG2. This may be appropriate if for example the logical channel having the LCID value of 1 is associated with either very low latency and/or very high frequency transmissions of small amounts of data.

A second logical channel, having LCID equal to 2 is, in the example of FIG. 7, mapped to the third CG, CG3.

A third logical channel, having LCID equal to 3 is not mapped to any CG. This may be appropriate for example if the data associated with the third logical channel is associated with a service or an application which generates either large amounts of data and has more relaxed quality of service requirements for example meaning that the data can be transmitted with a higher end-to-end latency, or that the data is generated in a periodic, or random, manner such that associating the logical channel with one of the CGs shown in FIG. 6 would not be appropriate.

Figure 8:
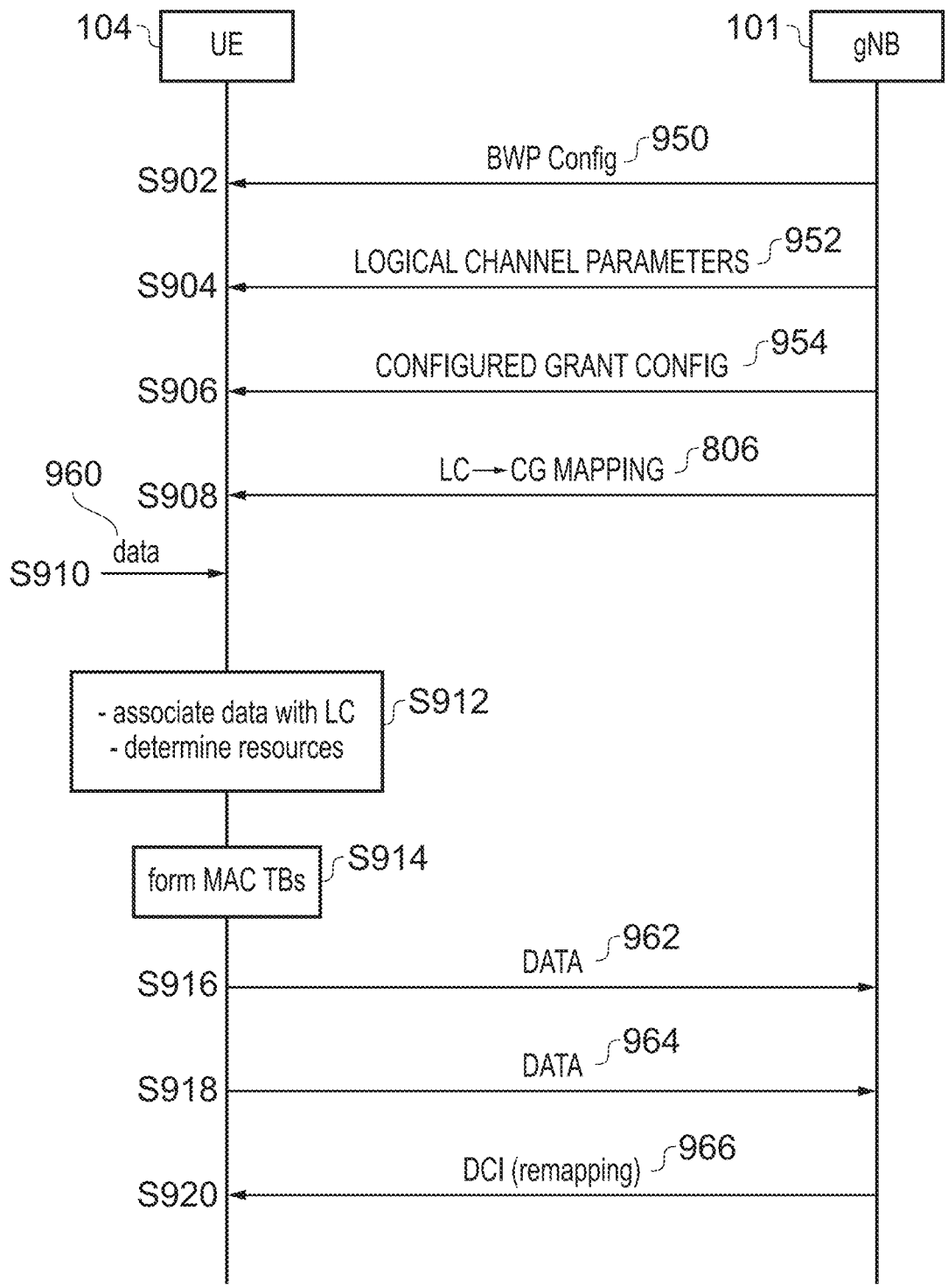
FIG. 8 illustrates a message sequence chart for the transmission of data by a communications device in accordance with embodiments of the present technique.

FIG. 8 illustrates a message sequence chart for the transmission of data by the communications device 104 in accordance with embodiments of the present technique.

FIG. 8 shows transmissions on the wireless access interface (such as the wireless access interface 700) between the infrastructure equipment 101 and the communications device 104.

The process of FIG. 8 starts at step S902 in which the infrastructure equipment 101 transmits to the communications device 104 a BWP Configuration indication 950, providing a description of one or more bandwidth parts which are configured for the communications device 104. For example, the BWP Configuration indication 950 may indicate the frequency ranges of the first and second BWPs BWP1, BWP2, illustrated in FIG. 6 and described above. The infrastructure equipment 101 also transmits logical channel parameters 952 to the communications device 104 at step S904.

The infrastructure equipment 101, at step S906, transmits CG configurations indication 954, in which parameters associated with communications resources making up one or more CGs are indicated.

At step S908, the infrastructure equipment 101 transmits to the communications device 104 an indication of the mapping 806 indicating the correspondence between the logical channels whose parameters are characterised in the logical channel parameters 952 and the one or more CGs whose parameters are indicated in the CG configurations indication 954. In some embodiments of the present technique one or more of the steps S902, S904, S906 and S908 may be combined, for example by transmitting one or more of the respective indications within a single message, such as an RRC reconfiguration message.

At step S910, the communications device 104 receives data 960 at its layer 2 (L2) protocol entity. The data 960 may be received from upper layers within the communications device 104 and may have been generated by one or more different applications. At step S912, the communications device 104 may associate each portion of the data 960 with a logical channel. The communications device 104 may thus determine communications resources on which the data 960 can be transmitted in accordance with the mapping indication 806 received in step S908 and the CG configurations indication 954 received in step S906.

In the example shown in FIG. 8 the data 960 comprises a first data portion 962 and a second data portion 964. In step S912 the first data portion 962 is determined to be associated with a first logical channel having a logical channel ID (LCID) of 1, and the second data portion 964 is determined to be associated with the second logical channel having a LCID of 2.

At step S914 the communications device 104 forms a MAC transport block for each of the first data portion 962 and the second data portion 964. That is, the communications device 104 performs any necessary encoding and packetization of the respective data. Subsequently the communications device 104 transmits the MAC transport block comprising the first data portion 962 using communications resources of the first CG, CG1 and at step S918 transmits the MAC transport block comprising the second data portion 964 using the communications resources of the third CG, CG3.

In some embodiments, at step S920, the infrastructure equipment 101 may transmit a remapping indication 966 to modify the mapping 806 between LC ID and CGC previously transmitted at step S908. In such embodiments, a subsequent mapping of data associated with a logical channel to communications resources associated with a particular CGC, and the transmission of such data by the communications device 104 to the infrastructure equipment 101 may be in accordance with the remapping indication 966.

It should be appreciated that the process shown in FIG. 8 may include other steps for example the communications device 104 may prior to step S902, transmit a request for communication resources to the infrastructure equipment 101. Similarly, in some embodiments, one or more of the steps in FIG. 8 may be modified, omitted, or performed in a different order from that shown, without departing from the scope of the present disclosure.

For example, in some embodiments, configured grants may be configured within the system bandwidth 702 and no BWPs may be configured for the communications device 104. In such embodiments, step S902 may therefore be omitted.

Figure 9:
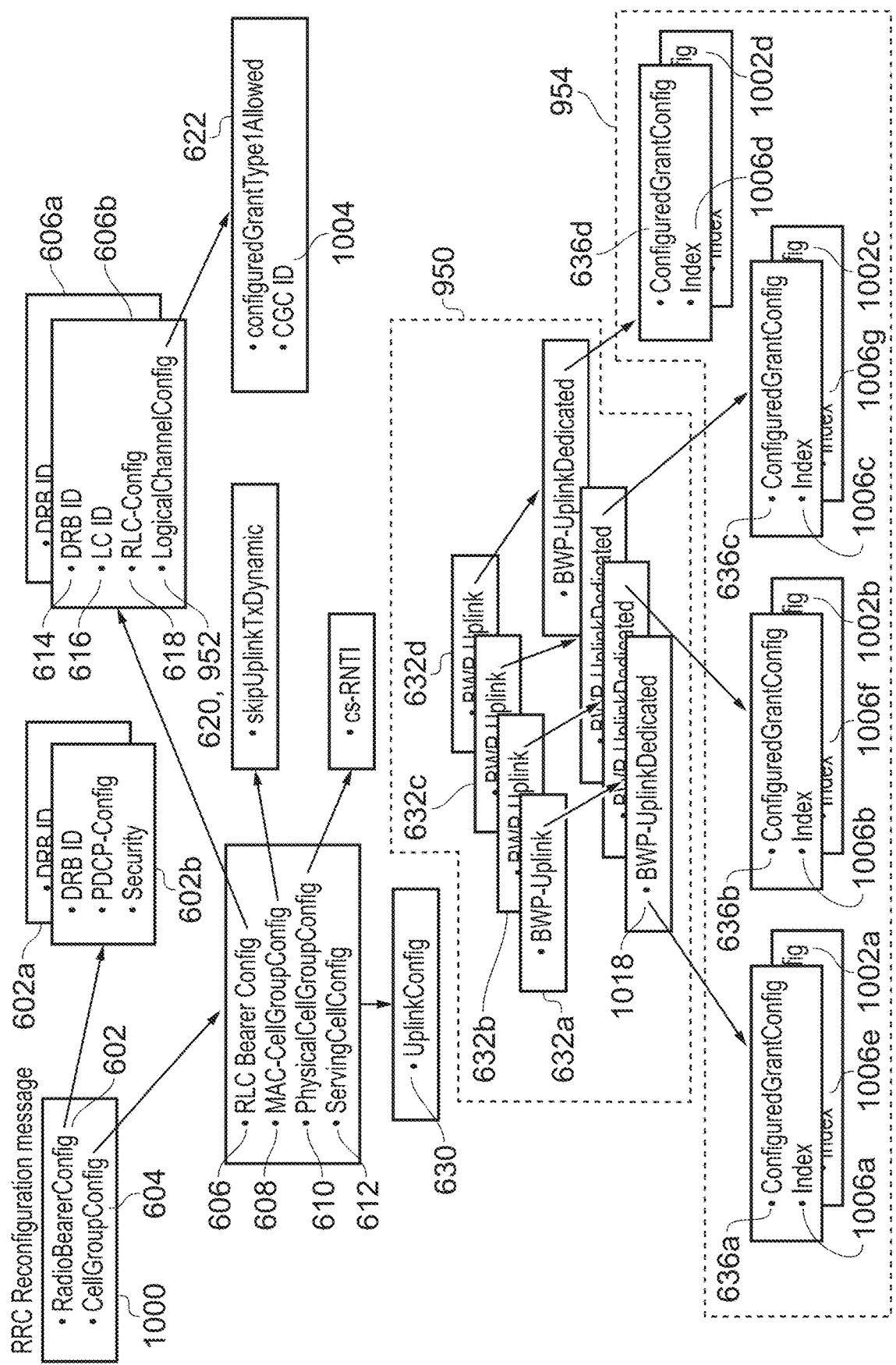
FIG. 9 illustrates a first adapted RRC Reconfiguration message for indicating a mapping between logical channels and configured grants, in accordance with embodiments of the present technique.

FIG. 9 illustrates a first adapted RRC Reconfiguration message 1000 for indicating a mapping between logical channels and configured grants, in accordance with embodiments of the present technique.

In many respects, the first adapted RRC Reconfiguration message 1000 is similar to the RRC Reconfiguration message 600 described above and illustrated in FIG. 5. As such, elements in the first adapted RRC Reconfiguration message 1000 which correspond to and have broadly the same functionality as in the RRC Reconfiguration message 600 shown in FIG. 5 will not be described here again for conciseness. In particular, elements which are shown in FIG. 9 as having reference numerals corresponding to reference numerals used in FIG. 5 may be broadly the same as described above in respect of FIG. 5.

In accordance with embodiments of the present technique, in the first adapted RRC Reconfiguration message 1000, BWP-UplinkDedicated IEs 1018 are adapted to permit the description of multiple configured grants within a single BWP. For example, in some embodiments, two or more ConfiguredGrantConfig IEs 636 may be included in each BWP-UplinkDedicated IE 1018.

In the example shown in FIG. 9 each BWP is shown as having two configured grants configured within each BWP. In respect of a first BWP, a first configured grant is described by a first ConfiguredGrantConfig IE 636a and a second configured grant is described by a second ConfiguredGrantConfig IE 1002a. Similarly second, third, and fourth BWPs are shown as having second ConfiguredGrantConfig IEs 1002b, 1002c and 1002d, respectively. Although in FIG. 9 each BWP as shown as having two configured grant configurations, in accordance with embodiments of the present technique, each BWP may thus be configured with zero, one, or more configured grants described in corresponding ConfiguredGrantConfig IEs.

Within each ConfiguredGrantConfig IE 636, 1002, is provided an indication of an CG index 1006 to identify the corresponding configured grant. For example, the CG index 1006a provided within the first instance of the ConfiguredGrantConfig IE 636a provide an index value which uniquely identifies the configured grant whose resources are described in the ConfiguredGrantConfig IE 636a amongst all configured grants which are configured for the communications device 104. Thus each instance of the ConfiguredGrantConfig IE 636, 1002 may be provided with a corresponding CG index indication 1006.

In some embodiments of the present technique the index may be implicitly indicated. For example, in some embodiments the index may be determined by the communications device 104 based on the order in which the respective ConfiguredGrantConfig IE 636, 1002 instance appears within the first adapted RRC reconfiguration message 1000.

In some embodiments, no index is added to legacy instance(s) (e.g. those within a portion of the message structure associated with a particular version or release of a specification) of a particular ConfiguredGrantConfig IE 636, and the index values for these are determined in accordance with a predetermined rule, such as based on the order in which the respective legacy instance of ConfiguredGrantConfig IE 636 appears within the first adapted RRC reconfiguration message 1000. By minimising modifications to existing message elements, backwards compatibility is improved. In addition, 'new' instances of the ConfiguredGrantConfig IEs 1002 (e.g. those within a portion of the message structure associated with a later version or release of the specification) are accompanied by an explicit index indication. By minimising modifications to existing message elements, backwards compatibility is improved.

Collectively, the various instances of the ConfiguredGrantConfig IEs 636a, 636b, 636c, 636d, 1002a, 1002b, 1002c, 1002d collectively may form some or all of the CG configurations indication 954 described above in respect of FIG. 8.

Similarly, the BWP-Uplink IEs 632a, 632b, 632c, 632d, and the BWP-UplinkDedicated IEs 1018 of FIG. 9 may together form some or all of the BWP Configuration indication 950 described above in respect of FIG. 8.

In some embodiments of the present technique the LogicalChannelConfig IE 620 is extended to comprise an indication of an CG configuration index 1004, which comprises an indication of an index associated with a configured grant configuration. The presence of the CG configuration index 1004 within an instance of the LogicalChannelConfig IE 620 indicates that the communications resources associated with CG configuration having (as indicated by the respective CG index 1006 associated with a ConfiguredGrantConfig IE 636, 1002) the index value equal to that indicated by the CG configuration index 1004 may be used for the transmission of data associated with the logical channel associated with the instance of the LogicalChannelConfig IE 620.

In some embodiments, the ConfiguredGrantType1Allowed indication 622 may be omitted from the LogicalChannelConfig IE 620, since the presence of a CG configuration index 1004 indicates that communications resources associated with a (specific) CG may be used for the transmission of data for that logical channel.

Thus there may be provided, by means of a combination of the CG configuration index 1004 and the logical channel ID 616, a mapping which may correspond to the mapping 806 described above in respect of FIG. 7 and FIG. 8 indicating the correspondence between the logical channels whose parameters are characterised in the logical channel parameters 952 and the one or more CGs whose parameters are indicated in the CG configurations indication 954. In addition the LogicalChannelConfig IE 620 may provide the logical channel parameters 952 described in FIG. 8 above.

It will thus be appreciated that by means of the first adapted RRC reconfiguration message 1000, the infrastructure equipment 101 may transmit to the communications device 104 an indication of a plurality of configured grants associated with a single bandwidth part and moreover may indicate a correspondence between a logical channel and between zero, one or more configured grants. Thus there may be provided a method of indicating to a communications device a mapping between logical channels which may be associated with respective quality of service requirements and one or more of a plurality of configured grants which provide periodic uplink communication resources for the transmission of data by the communications device.

In the example of FIG. 6 as described above, the communications resources associated with the three CGs, CG1, CG2, CG3 are within one of two configured bandwidth parts, BWP1, BWP2. The use of bandwidth parts permits a communications device such as the communications device 104 to operate within a reduced frequency range compared with the complete frequency range 702 of the uplink portion of the wireless access interface 700.

However in many applications the complexity and additional signalling associated with the configuration and activation of bandwidth parts may not be justified or may not be used for other reasons. For example, in scenarios where communication devices have continuous access to power and are not thus power-constrained, it may be more appropriate to operate within the system bandwidth 702 without configuring bandwidth parts within that system bandwidth.

Thus, according to some embodiments of the present technique, CGs are defined within the system bandwidth 702 and are not associated with specific bandwidth parts. Therefore, in some such embodiments, the BWP Configuration indication 950 is not present.

Figure 10:
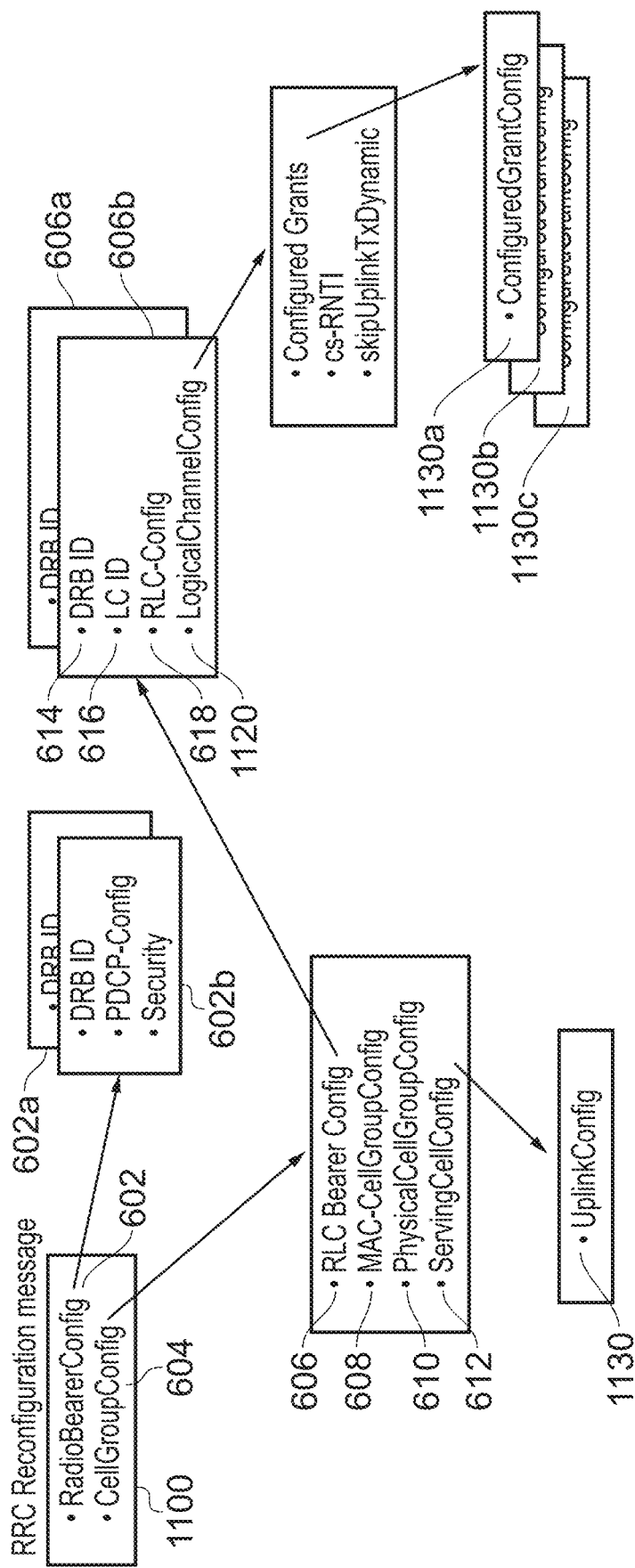
FIG. 10 illustrates a second adapted RRC Reconfiguration message for indicating a mapping between logical channels and configured grants, in accordance with embodiments of the present technique.

FIG. 10 illustrates a second adapted RRC Reconfiguration message 1100 for indicating a mapping between logical channels and configured grants, in accordance with embodiments of the present technique, in which no bandwidth part configuration 950 is provided.

In the second adapted RRC reconfiguration message 1100 shown in FIG. 10, elements having reference numerals corresponding to those in FIG. 5 perform similar functions and their functions will not be described again for conciseness.

In some embodiments, unlike the example shown in FIG. 9, the ConfiguredGrantConfig IEs 636, 1006 are not provided within an information element associated with a particular bandwidth part as will now be described.

As in the examples shown in FIG. 5 and in FIG. 9, parameters associated with each RLC protocol entity are provided within the RLC Bearer Config IE 606. Because there is a one-to-one mapping between logical channel and RLC protocol entity, then within each instance of the RLC Bearer Config IE 606 there is a corresponding LogicalChannelConfig IE 620, providing parameters for the logical channel associated with the RLC protocol entity whose parameters are provided by the RLC Bearer Config IE 606.

In the example shown in FIG. 10, the LogicalChannelConfig IE 1120 comprises a CG configuration IE 1130 in respect of each CG (if any) whose communication resources may be used for the transmission of uplink data associated with the corresponding logical channel. For example in FIG. 10 the RLC Bearer Config IE instance 606b comprises the LogicalChannelConfig information element 1120 which in turn comprises three instances 1130a, 1130b, 1130c of CG configuration IE 1130.

Each instance of the CG config IE 1130 provides an indication of periodic communication resources within the system bandwidth 702 which may be used by the communications device 104 for the transmission of uplink data associated with the logical channel. As such, the CG config IE 1130 may 1130 may provide substantially similar information as a convention ConfiguredGrantConfig IE 636, except that it is applicable in the context of the entire system bandwidth 702, rather than a particular BWP.

In addition, the LogicalChannelConfig IE 1120 may comprise the skip uplink TX indication and the CSRNTI indication applicable to the corresponding logical channel data.

Because the communications resources of the CG are not within a configured bandwidth part, then in some embodiments no BWP-Uplink IEs 616 nor their respective constituent parts are included within the second adapted RRC reconfiguration message 1100. Therefore as shown in FIG. 10 the UplinkConfig IE 1130 (which may otherwise be similar to the UplinkConfig IE 630 described above in the context of FIG. 5) does not include any instance of the BWP-Uplink IE 616. However, for backward compatibility reasons, existing structure may include a single instance of BWP-Uplink IE.

The example embodiments described above may be adapted or combined and aspects described above in the context of an embodiment may be omitted without departing from the scope of the present disclosure. In particular, message contents which are illustrated or described as being at a particular level within a hierarchical message structure (in which a message comprises information elements which themselves may contain further information element), may in some embodiments be at a higher or lower hierarchical level than described. Information elements may in some embodiments include additional information elements or fields which are not shown or described above.

For example, in some embodiments (and not shown in FIG. 9 or FIG. 10), the first adapted RRC Reconfiguration message 1000 or second adapted RRC Reconfiguration message 1100 may additionally comprise one or more CGskipUplinkTxDynamic indications. Each CGskipUplinkTxDynamic indication may indicate whether, in respect of a single CG, the communications device 104 is required to transmit using communications resources even if it has no data to send. The CG associated with each CGskipUplinkTxDynamic indication may be indicated by means of its location within the message structure. For example, an instance of the CGskipUplinkTxDynamic indication may be included together with each instance of the CG configuration index 1004 included within an instance of the LogicalChannelConfig IE 620, or with each instance of the ConfiguredGrantConfig IE 636, 1002.

In some embodiments, the CG associated with each CGskipUplinkTxDynamic indication may be indicated by means of a further CG Index indicator associated with the respective CGskipUplinkTxDynamic indication. For example, one or more CGskipUplinkTxDynamic indications, together with an associated CG Index may be added to the MAC-CellGroupConfig IE 608.

In some embodiments, the first adapted RRC Reconfiguration message 1000 or second adapted RRC Reconfiguration message 1100 may additionally comprise one or more CG-cs-RNTI indications, each providing a radio network temporary identity (RNTI) to be used in downlink signalling associated with a particular CG. For example, the infrastructure equipment 101 may transmit downlink control information (DCI) on a physical downlink control channel (PDCCH), addressed by an RNTI to indicate that a type 2 CG associated with the CG-cs-RNTI is activated or deactivated.

As described above, aspects from the first adapted RRC Reconfiguration message 1000 and second adapted RRC Reconfiguration message 1100 may be combined. For example, the second adapted RRC Reconfiguration message 1100 may include bandwidth part descriptions, such as the BWP-Uplink IEs 632 shown in FIG. 9. Each instance of the ConfiguredGrantConfig IE 1130 (associated with a logical channel by means of its inclusion within the LogicalChannelConfig IE 1120) may be adapted to include a BWP indication to indicate which BWP the resources described by the ConfiguredGrantConfig IE 1130 are provided within.

For example, each BWP-Uplink IE 632 may be associated with an index value which is determined based on either an explicit indication or by implicit means such as by the order in which the instance appears within the message. Each ConfiguredGrantConfig IE 1130 may include a BWP Index value indication to indicate the associated BWP.

In some embodiments one or more instances of a ConfiguredGrantConfig IE (such as the legacy ConfiguredGrantConfig IE 636 shown in FIG. 5 and FIG. 9) may be included within a structure (such as an IE) conventionally associated with a BWP, such as the BWP-Uplink IE 632. In addition, one or more additional instances of a ConfiguredGrantConfig IE (such as the ConfiguredGrantConfig IE 1130 of FIG. 10) may be included within a structure associated with a particular logical channel, such as the LogicalChannelConfig IE 1120 shown in FIG. 10 and described above. In some such embodiments, one or more instances of the BWP-Uplink IE 632 (including instances of the legacy ConfiguredGrantConfig IE 636) may be included even if no BWPs are in fact configured for the communications device 104.

In some embodiments some or all of the mapping 806 is provided by the relative locations within a message of the parameters associated with a logical channel, a configured grant, or both. In some embodiments, the mapping 806 is provided by means of an explicit mapping, which thus may be located anywhere within the structure of the message, such as the first adapted RRC Reconfiguration message 1000 or the second adapted RRC Reconfiguration message 1100. In some such embodiments, implicit or explicit indications may be provided of index values associated with each logical channel and with each configured grant, which may be in accordance with examples described above.

In some embodiments, some or all of the mapping 806 may be located within the CellGroupConfig IE 604, for example at the same hierarchical level as the RLC Bearer Config IE 606.

Although the examples described herein have been described in the context of uplink data transmission from a communications device to an infrastructure equipment, it will be readily appreciated that the techniques described herein may be applied in respect of the indication of downlink configured grants/semi-persistent scheduling and that messages may be accordingly adapted to permit the indication of multiple such grants within a single BWP or within the system bandwidth.

As described above, in some embodiments, after the receipt of, for example, either the first adapted RRC Reconfiguration message 1000 or the second adapted RRC Reconfiguration message 1100, the communications device 104 may transmit data in accordance with the logical channel-to-configured grant mapping provided therein. However, in some embodiments, after the receipt of such a message, the communications device 104 may transmit data in accordance with one or more conventional techniques, for example, by applying a conventional mapping rule whereby data associated with any logical channel may be transmitted on communications resources associated with a particular configured grant, provided that appropriate prioritisation rules are followed within the MAC protocol entity.

Thus there has been described a method for transmitting data by a communications device in a cell of a wireless communications network, the method comprising receiving an indication of a plurality of configured grants, each of the configured grants allocating a sequence of communications resources for the transmission of the data in the cell by the communications device, receiving an indication of a mapping between each of a plurality of logical channels and one or more of the plurality of configured grants, and transmitting a first portion of the data associated with a first logical channel of the plurality of logical channels using communications resources allocated by one of the plurality of configured grants, in accordance with the mapping.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to machine type communication devices/IoT devices or other narrowband communications devices, but can be applied more generally, for example in respect of any type communications device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a communications device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method for transmitting data by a communications device in a cell of a wireless communications network, the method comprising receiving an indication of a plurality of configured grants, each of the configured grants allocating a sequence of communications resources for the transmission of the data in the cell by the communications device, receiving an indication of a mapping between each of a plurality of logical channels and one or more of the plurality of configured grants, and transmitting a first portion of the data associated with a first logical channel of the plurality of logical channels using communications resources allocated by one of the plurality of configured grants, in accordance with the mapping.

Paragraph 2. A method according to paragraph 1, the method comprising transmitting a second portion of the data associated with a second logical channel of the plurality of logical channels using communications resources allocated by one of the plurality of configured grants, in accordance with the mapping Paragraph 3. A method according to paragraph 2, the method comprising associating the first portion of the data with the first logical channel, and the second portion of the data with a second logical channel.

Paragraph 4. A method according to any of paragraphs 1 to 3, wherein the indication of the plurality of configured grants and the indication of the mapping between each of the plurality of logical channels and the one or more of the plurality of configured grants are received in a radio resource control, RRC, reconfiguration message.

Paragraph 5. A method according to any of paragraphs 1 to 4, wherein receiving the indication of the plurality of configured grants comprises receiving a message, the message comprising a plurality of configured grant message elements each comprising an indication of one of the plurality of configured grants and having an associated configured grant index indication, the plurality of configured grant message elements providing the indication of the plurality of configured grants.

Paragraph 6. A method according to any of paragraphs 1 to 4, wherein receiving the indication of the plurality of configured grants comprises receiving a message, the message comprising one or more configured grant message elements each comprising an indication of one of the plurality of configured grants and having an associated configured grant index indication, and one or more configured grant message elements each comprising an indication of one of the plurality of configured grants and having no associated configured grant index indication, the method comprising determining an index value associated with each of the plurality of configured grants.

Paragraph 7. A method according to paragraph 6, wherein the one or more configured grant message elements having no associated configured grant index indication are each within a message element for conveying information regarding a bandwidth part.

Paragraph 8. A method according to paragraph 6 or paragraph 7, wherein the one or more configured grant message elements having an associated configured grant index indication are within a message element for conveying parameters for the operation of one or more RLC protocol entities.

Paragraph 9. A method according to any of paragraphs 1 to 8, wherein the communications resources allocated by each of the configured grants is within with one of a plurality of bandwidth parts, each of the plurality of bandwidth parts defining a frequency range within a system bandwidth of the cell of the wireless communications network, the method comprising: receiving an indication of the plurality of bandwidth parts.

Paragraph 10. A method according to paragraph 9, wherein the indication of the plurality of bandwidth parts is received in a radio resource control, RRC, reconfiguration message.

Paragraph 11. A method according to paragraph 10, wherein the RRC reconfiguration message comprises a portion associated with a serving cell and a portion associated with one or more radio bearers comprising the indication of the mapping between each of the plurality of logical channels.

Paragraph 12. A method according to paragraph 10, wherein the RRC reconfiguration message comprises a portion providing parameters associated with a configuration of a group of one or more cells, the portion comprising the indication of the mapping between each of the plurality of logical channels.

Paragraph 13. A method according to any of paragraphs 1 to 12, the method comprising: receiving an indication of an identity associated with one of the plurality of configured grants, receiving control information within a transmission having a destination address corresponding to the identity, and determining a status of the one of the plurality of configured grants based on the control information.

Paragraph 14. A method according to paragraph 13, wherein the control information is transmitted using a physical downlink control channel.

Paragraph 15. A method according to any of paragraphs 1 to 14, wherein receiving an indication of a plurality of configured grants comprises receiving from an infrastructure equipment of the wireless communications network the indication of the plurality of configured grants and transmitting a first portion of the data comprises transmitting the first portion of the data to the infrastructure equipment.

Paragraph 16. A method for receiving data by an infrastructure equipment in a cell of a wireless communications network, the method comprising transmitting an indication of a plurality of configured grants, each of the configured grants allocating a sequence of communications resources for the transmission of the data in the cell by a communications device, transmitting an indication of a mapping between each of a plurality of logical channels and one or more of the plurality of configured grants, and receiving a first portion of the data associated with a first logical channel of the plurality of logical channels using communications resources allocated by one of the plurality of configured grants, in accordance with the mapping.

Paragraph 17. A method according to paragraph 16, the method comprising receiving a second portion of the data associated with a second logical channel of the plurality of logical channels and transmitted by the communications device using communications resources allocated by one of the plurality of configured grants, in accordance with the mapping Paragraph 18. A method according to paragraph 17, the method comprising associating the first portion of the data with the first logical channel, and the second portion of the data with a second logical channel.

Paragraph 19. A method according to any of paragraphs 16 to 18, wherein the indication of the plurality of configured grants and the indication of the mapping between each of the plurality of logical channels and the one or more of the plurality of configured grants are transmitted in a radio resource control, RRC, reconfiguration message.

Paragraph 20. A method according to any of paragraphs 16 to 19, wherein transmitting the indication of the plurality of configured grants comprises transmitting a message, the message comprising a plurality of configured grant message elements each comprising an indication of one of the plurality of configured grants and having an associated configured grant index indication, the plurality of configured grant message elements providing the indication of the plurality of configured grants.

Paragraph 21. A method according to any of paragraphs 16 to 19, wherein transmitting the indication of the plurality of configured grants comprises transmitting a message, the message comprising one or more configured grant message elements each comprising an indication of one of the plurality of configured grants and having an associated configured grant index indication, and one or more configured grant message elements each comprising an indication of one of the plurality of configured grants and having no associated configured grant index indication, the method comprising determining an index value associated with each of the plurality of configured grants.

Paragraph 22. A method according to paragraph 21, wherein the one or more configured grant message elements having no associated configured grant index indication are each within a message element for conveying information regarding a bandwidth part.

Paragraph 23. A method according to paragraph 21 or paragraph 22, wherein the one or more configured grant message elements having an associated configured grant index indication are within a message element for conveying parameters for the operation of one or more RLC protocol entities.

Paragraph 24. A method according to any of paragraphs 16 to 23, wherein the communications resources allocated by each of the configured grants is within with one of a plurality of bandwidth parts, each of the plurality of bandwidth parts defining a frequency range within a system bandwidth of the cell of the wireless communications network, the method comprising: transmitting an indication of the plurality of bandwidth parts.

Paragraph 25. A method according to paragraph 24, wherein the indication of the plurality of bandwidth parts is transmitted in a radio resource control, RRC, reconfiguration message.

Paragraph 26. A method according to paragraph 25, wherein the RRC reconfiguration message comprises a portion associated with a serving cell and a portion associated with one or more radio bearers comprising the indication of the mapping between each of the plurality of logical channels.

Paragraph 27. A method according to paragraph 25, wherein the RRC reconfiguration message comprises a portion providing parameters associated with a configuration of a group of one or more cells, the portion comprising the indication of the mapping between each of the plurality of logical channels.

Paragraph 28. A method according to any of paragraphs 16 to 27, the method comprising: transmitting an indication of an identity associated with one of the plurality of configured grants, transmitting control information within a transmission having a destination address corresponding to the identity, the control information indicating a status of the one of the plurality of configured grants.

Paragraph 29. A method according to paragraph 28, wherein the control information is transmitted using a physical downlink control channel.

Paragraph 30. A communications device for use in a wireless communications network, the wireless communications network comprising an infrastructure equipment providing a wireless access interface, the communications device comprising a transmitter configured to transmit data via the wireless access interface, a receiver configured to receive signals, and a controller configured to control the transmitter and the receiver so that the communications device is operable: to receive an indication of a plurality of configured grants, each of the configured grants allocating a sequence of communications resources for the transmission of the data in the cell by the communications device, to receive an indication of a mapping between each of a plurality of logical channels and one or more of the plurality of configured grants, and to transmit a first portion of the data associated with a first logical channel of the plurality of logical channels using communications resources allocated by one of the plurality of configured grants, in accordance with the mapping.

Paragraph 31. Circuitry for a communications device for use in a wireless communications network, the wireless communications network comprising an infrastructure equipment providing a wireless access interface, the circuitry comprising transmitter circuitry configured to transmit data via the wireless access interface, receiver circuitry configured to receive signals, and controller circuitry configured to control the transmitter circuitry and the receiver circuitry so that the communications device is operable: to receive an indication of a plurality of configured grants, each of the configured grants allocating a sequence of communications resources for the transmission of the data in the cell by the communications device, to receive an indication of a mapping between each of a plurality of logical channels and one or more of the plurality of configured grants, and to transmit a first portion of the data associated with a first logical channel of the plurality of logical channels using communications resources allocated by one of the plurality of configured grants, in accordance with the mapping.

Paragraph 32. Infrastructure equipment for use in a wireless communications network, the infrastructure equipment providing a wireless access interface, the infrastructure equipment comprising a transmitter configured to transmit signals to a communications device via the wireless access interface in a cell, a receiver configured to receive data from the communications device, and a controller, configured to control the transmitter and the receiver so that the infrastructure equipment is operable: to transmit an indication of a plurality of configured grants, each of the configured grants allocating a sequence of communications resources for the transmission of the data in the cell by a communications device, to transmit an indication of a mapping between each of a plurality of logical channels and one or more of the plurality of configured grants, and to receive a first portion of the data associated with a first logical channel of the plurality of logical channels using communications resources allocated by one of the plurality of configured grants, in accordance with the mapping.

Paragraph 33. Circuitry for an infrastructure equipment for use in a wireless communications network, the infrastructure equipment providing a wireless access interface, the circuitry comprising transmitter circuitry configured to transmit signals to a communications device via the wireless access interface in a cell, receiver circuitry configured to receive data from the communications device, and controller circuitry, configured to control the transmitter circuitry and the receiver circuitry so that the infrastructure equipment is operable: to transmit an indication of a plurality of configured grants, each of the configured grants allocating a sequence of communications resources for the transmission of the data in the cell by a communications device, to transmit an indication of a mapping between each of a plurality of logical channels and one or more of the plurality of configured grants, and to receive a first portion of the data associated with a first logical channel of the plurality of logical channels using communications resources allocated by one of the plurality of configured grants, in accordance with the mapping.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP TS 38.300 v. 15.2.0 "NR; NR and NG-RAN Overall Description; Stage 2(Release 15)", June 2018
[2] Holma H. and Toskala A, "LTE for UMTS OFDMA and SC-FDMA based radio access", John Wiley and Sons, 2009
[3] 3GPP TR 38.913, "Study on Scenarios and Requirements for Next Generation Access Technologies (Release 14)".
[4] 3GPP TS 38.214 "NR; Physical layer procedures for data (Release 15)", version 15.3.0
[5] 3GPP TR 38.825
[6] R2-1818991, "LS on multiple active configured grant configurations", RAN2#104.

What is claimed is:

1. A communications device for use in a wireless communications network, the wireless communications network comprising an infrastructure equipment providing a wireless access interface, the communications device comprising:
 circuitry configured to:
  receive an indication of a plurality of configured grants, each of the configured grants allocating a sequence of communications resources for the transmission of the data in the cell by the communications device, wherein each configured grant has an associated periodicity for repeated allocation of the communications resources,
  receive an indication of a mapping between individual logical channels and one or more of the plurality of configured grants, wherein the mapping indicates which specific logical channels can use which specific configured grants, and
  transmit a first portion of the data associated with a first logical channel of the plurality of logical channels using communications resources allocated by one of the plurality of configured grants having a periodicity corresponding to characteristics of the first logical channel, in accordance with the mapping,
wherein the mapping is provided within a cell configuration portion of an RRC reconfiguration message, the cell configuration portion including a plurality of configured grant descriptors each having a unique configured grant identifier.

2. The communications device of claim 1, wherein the circuitry is further configured to
transmit a second portion of the data associated with a second logical channel of the plurality of logical channels using communications resources allocated by one of the plurality of configured grants, in accordance with the mapping.

3. The communications device of claim 2, wherein the circuitry is further configured to
associate the first portion of the data with the first logical channel, and the second portion of the data with a second logical channel.

4. The communications device of claim 1, wherein the indication of the plurality of configured grants and the indication of the mapping between each of the plurality of logical channels and the one or more of the plurality of configured grants are received in a radio resource control, RRC, reconfiguration message.

5. The communications device of claim 1, wherein the circuitry for receiving the indication of the plurality of configured grants includes receiving a message, the message including a plurality of configured grant message elements each comprising an indication of one of the plurality of configured grants and having an associated configured grant index indication, the plurality of configured grant message elements providing the indication of the plurality of configured grants.

6. The communications device of claim 1, wherein the circuitry for receiving the indication of the plurality of configured grants includes receiving a message, the message including
one or more configured grant message elements each comprising an indication of one of the plurality of configured grants and having an associated configured grant index indication, and
one or more configured grant message elements each comprising an indication of one of the plurality of configured grants and having no associated configured grant index indication,
wherein the circuitry is further configured to
determine an index value associated with each of the plurality of configured grants.

7. The communications device of claim 6, wherein the one or more configured grant message elements having no associated configured grant index indication are each within a message element for conveying information regarding a bandwidth part.

8. The communications device of claim 6, wherein the one or more configured grant message elements having an associated configured grant index indication are within a message element for conveying parameters for the operation of one or more RLC protocol entities.

9. The communications device of claim 1, wherein the communications resources allocated by each of the configured grants is within with one of a plurality of bandwidth parts, each of the plurality of bandwidth parts defining a frequency range within a system bandwidth of the cell of the wireless communications network,
wherein the circuitry is further configured to
receive an indication of the plurality of bandwidth parts.

10. The communications device of claim 9, wherein the indication of the plurality of bandwidth parts is received in a radio resource control, RRC, reconfiguration message.

11. The communications device of claim 10, wherein the RRC reconfiguration message comprises a portion associated with a serving cell and a portion associated with one or more radio bearers comprising the indication of the mapping between each of the plurality of logical channels.

12. The communications device of claim 1, wherein the circuitry is further configured to
receive an indication of an identity associated with one of the plurality of configured grants,
receive control information within a transmission having a destination address corresponding to the identity, and
determine a status of the one of the plurality of configured grants based on the control information.

13. The communications device of claim 1, wherein the circuitry is further configured to
receive, from an infrastructure equipment of the wireless communications network, the indication of the plurality of configured grants, and
transmit the first portion of the data to the infrastructure equipment.

14. Infrastructure equipment for use in a wireless communications network, the infrastructure equipment providing a wireless access interface, the infrastructure equipment comprising:
circuitry configured to
transmit an indication of a plurality of configured grants, each of the configured grants allocating a sequence of communications resources for the transmission of the data in the cell by a communications device, wherein each configured grant has an associated periodicity for repeated allocation of the communications resources,
transmit an indication of a mapping between individual logical channels and one or more of the plurality of configured grants, wherein the mapping indicates which specific logical channels can use which specific configured grants, and
receive a first portion of the data associated with a first logical channel of the plurality of logical channels using communications resources allocated by one of the plurality of configured grants having a periodicity corresponding to characteristics of the first logical channel, in accordance with the mapping,
wherein the mapping is provided within a cell configuration portion of an RRC reconfiguration message, the cell configuration portion including a plurality of configured grant descriptors each having a unique configured grant identifier.

15. The infrastructure equipment of claim 14, wherein the circuitry is further configured to
receive a second portion of the data associated with a second logical channel of the plurality of logical channels and transmitted by the communications device using communications resources allocated by one of the plurality of configured grants, in accordance with the mapping.

16. The infrastructure equipment of claim 15, wherein the circuitry is further configured to
associate the first portion of the data with the first logical channel, and the second portion of the data with a second logical channel.

17. The infrastructure equipment of claim 14, wherein the circuitry is further configured to wherein the indication of the plurality of configured grants and the indication of the mapping between each of the plurality of logical channels and the one or more of the plurality of configured grants are transmitted in a radio resource control, RRC, reconfiguration message.

18. The infrastructure equipment of claim 14, wherein the circuitry for transmitting the indication of the plurality of configured grants is further configured to transmit a message, the message including a plurality of configured grant message elements each comprising an indication of one of the plurality of configured grants and having an associated configured grant index indication, the plurality of configured grant message elements providing the indication of the plurality of configured grants.

19. The infrastructure equipment of claim 14, wherein the circuitry for transmitting the indication of the plurality of configured grants is further configured to transmit a message, the message including
one or more configured grant message elements each comprising an indication of one of the plurality of configured grants and having an associated configured grant index indication, and
one or more configured grant message elements each comprising an indication of one of the plurality of configured grants and having no associated configured grant index indication, the method comprising
determining an index value associated with each of the plurality of configured grants.

20. Circuitry for an infrastructure equipment for use in a wireless communications network, the infrastructure equipment providing a wireless access interface, the circuitry being configured to:

transmit an indication of a plurality of configured grants, each of the configured grants allocating a sequence of communications resources for the transmission of the data in the cell by a communications device, wherein each configured grant has an associated periodicity for repeated allocation of the communications resources, transmit an indication of a mapping between individual logical channels and one or more of the plurality of configured grants, wherein the mapping indicates which specific logical channels can use which specific configured grants, and receive a first portion of the data associated with a first logical channel of the plurality of logical channels using communications resources allocated by one of the plurality of configured grants having a periodicity corresponding to characteristics of the first logical channel, in accordance with the mapping, wherein the mapping is provided within a cell configuration portion of an RRC reconfiguration message, the cell configuration portion including a plurality of configured grant descriptors each having a unique configured grant identifier.

* * * * *